(12) United States Patent
Pedreiro

(10) Patent No.: US 6,454,215 B1
(45) Date of Patent: Sep. 24, 2002

(54) SPACECRAFT ARCHITECTURE FOR DISTURBANCE-FREE PAYLOAD

(75) Inventor: Nelson Pedreiro, Menlo Park, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/770,252

(22) Filed: Jan. 29, 2001

(51) Int. Cl.$^7$ ................................................ B64G 1/22
(52) U.S. Cl. ................................................ 244/158 R
(58) Field of Search ............................ 244/158 R, 171; 248/638; 188/378

(56) References Cited

U.S. PATENT DOCUMENTS

| | | | |
|---|---|---|---|
| 3,892,467 A | 7/1975 | Shin | 350/16 |
| 3,952,979 A | 4/1976 | Hansen | 248/20 |
| 4,033,541 A | 7/1977 | Malueg | 248/358 |
| 4,088,018 A | 5/1978 | Anderson et al. | |
| 4,315,610 A | 2/1982 | Malueg | 244/3.16 |
| 4,443,743 A | 4/1984 | Forys et al. | 318/115 |
| 4,498,038 A | 2/1985 | Malueg | 318/648 |
| 4,848,525 A | 7/1989 | Jacot et al. | 188/378 |
| 5,020,743 A | 6/1991 | Von Bun et al. | |
| 5,305,981 A | 4/1994 | Cunningham et al. | 248/550 |
| 5,638,303 A * | 6/1997 | Edberg et al. | 364/559 |
| 5,820,079 A | 10/1998 | Harrell | |
| 6,322,060 B1 * | 11/2001 | Mayama et al. | 267/136 |

FOREIGN PATENT DOCUMENTS

| | | |
|---|---|---|
| DE | 19921390 | 11/2000 |
| FR | 2698187 | 5/1994 |

OTHER PUBLICATIONS

Grodsinsky, C. M. et al., "Vibration Isolation Technology: An Executive Summary of Systems Development and Demonstration", NASA Technical Memorandum 105937, Jan. 1993.

Knospe, C.R., et al., "Magnetic Actuators and Suspension for Space Vibration Control", NASA Contractor Report 193038, May 1993.

Spanos, J., et al., "Active Vibration Isolation on an Experimental Flexible Structure", SPIE, v. 1917, 1993.

Luniewics, M.F., et al., "Comparison of Wide–band Inertial Line of Sight Stabilization Reference Mechanizations", SPIE, v. 1697, 1992.

Collins, S.A., et al., "Active Vibration Isolation for Spacecraft", 42$^{nd}$ Congress of the International Astronautical Federation, Montreal, Canada, Oct. 1991.

Sinha, A. et al., "A New Approach to Active Vibration Isolation for Microgravity Space Experiments", NASA Technical Memorandum 102470 Feb. 1990.

Perez, E., et al., "Pointing Acqusition and Tracking System for Silex Inter Satellite Optical Link", SPIE, v. 1111, 1989.

Laskin, R.A., and Sirlin, S.W., "Future Payload Isolation and Pointing System Technology", Journal of Guidance Navigation and Control, v. 9, No. 4 Jul.–Aug. 1986.

*Primary Examiner*—Peter M. Poon
*Assistant Examiner*—Tim D. Collins
(74) *Attorney, Agent, or Firm*—Swidler Berlin Shereff Friedman, LLP

(57) ABSTRACT

The system of the present invention is a spacecraft architecture for precision motion control of a payload while isolating disturbances and vibrations to the payload. The motion of the payload module is controlled by reacting on the support module using non-contact actuators disposed between the two modules. The motion of the support module is controlled to follow the payload module using external actuators that react against the surroundings. This system achieves vibration isolation down to zero frequency and is not limited by sensor characteristics.

49 Claims, 14 Drawing Sheets

OTHER PUBLICATIONS

Sellers, J., "Impact of Magnetic Isolation on Pointing System Performance in the Presence of Structural Flexibility", NASA Contractor Report 172481, Feb. 1985.

Forys, E.L., "Internal Bearing Stabilized Sighting Unit (IBSSU)—a new concept in stabilization", SPIE, v.242, Jul. 29–30, 1980.

Cunningham, D., et al., "Design of the Annular Suspension and Pointing System (ASPS)", NASA Contractor Report 3343, 1980.

Baumann, J.L., and Dixon, M.D., "Analysis and Simulation of an Advanced Inertial Stabilization Concept", 1979 Winter Simulation Conference.

Studer, P.A., "Magnetic Bearings for Instruments in the Space Environment", NASA Technical Memorandum 78048, 1978.

Rahman, Z. H., et al., "Multi–axis vibration isolation, suppression and steering system for space observational applications", SPIE, v. 3351, 1998.

Edberg, D. et al, "Results of the Stable Microgravity Vibration Isolation Flight Experiment", AAS 96–071, 1996.

Geng, Z. J. et al., "An Intelligent Control System for Multiple Degree–of Freedom Vibration Isolation", Journal of Intelligent Material Systems and Structures, v. 6, Nov. 1995.

Belvin, W. K., "On the Isolation of Science Payloads from Spacecraft Vibrations", AIAA 95–1234, 1995.

Lubomski, J.F. et al., "Final Report—Vibration Isolation Technology (VIT) ATD Project", NASA Technical Memorandum 106496, Mar. 1994.

Beard, A.M., et al., "A Practical Product Implementation of an Active/Passive Vibration Isolation System", SPIE, v. 2264, 1994.

HollKamp, J.J., and Starchville, T.F. Jr., "A Self–Tunning Piezoelectric Vibration Absorber", Journal of Intelligent Material Systems and Structures, v. 5, Jul. 1994.

Downer, J. et al., "An Advanced Actuator for High–Performance Slewing", NASA Contractor Report 4179, 1988.

Honeywell Inc., "Space Active Vibration Isolation (SAVI): Option Phase Prototype Fabrication and Test Final Report", Jun. 1991.

Collins et al., "Active Vibration Isolation for Spacecraft", Oct. 1991.*

Geng et al., "An Intelligent Control System for Multiple Degree–of–Freedom Vibration Isolation", Nov. 1995.*

Owen, R. G., et al., "Mechanical Design and Simulation of a Microgravity Isolation Mount for Columbus," Journal of Spacecraft and Rockets, American Institute of Aeronautics and Astronautics, New York, vol. 30, No. 4, Jul. 1, 1993, pp. 502–508.

* cited by examiner

SPACECRAFT ARCHITECTURE FOR DISTURBANCE-FREE PAYLOAD

FIELD OF THE INVENTION

The present invention relates generally to spacecraft architecture, and more specifically, to a spacecraft control architecture that provides a payload environment that is free from spacecraft-borne vibrations while still being able to control the motion of the payload in space.

DESCRIPTION OF THE RELATED ART

In many spacecraft-borne missions, it is imperative to attenuate mechanical disturbances and thus isolate a payload from vibrations generated on the spacecraft while retaining the capability of precisely controlling the motion of the payload. The problem caused by vibrations is common to scientific, commercial and military missions. Examples of scientific missions that are particularly affected by spacecraft vibrations are space-based telescopes, such as the Hubble Space Telescope and the proposed Next Generation Space Telescope, and space-based interferometers, such as NASA's Space Interferometery Mission. In the future, the use of laser-based communications, requiring precision pointing between satellites, will likely increase the significance of the problem for commercial payloads. Finally, motion stability and precision pointing and tracking are key technologies for military apparatus such as earth observatories and space-based defense and missile systems, such as the proposed space-based laser systems.

As reported in NASA Technical Memorandum 106496, titled *Final Report—Vibration Isolation Technology* (VIT) A TD Project by J. Lubomski et al. (March 1994), a wide variety of vibration isolation technologies have been considered. Passive isolation tends to be more cost effective, but has limited effectiveness specially at low frequencies. In general, active systems require sensing of motion or position, and a feedback and/or feedforward control loop to counteract mechanical excitation and minimize motion of an isolated body. Such systems typically introduce the complexity of a high-gain control system and isolation performance is limited by sensor characteristics.

Z. Geng et al. describes a vibration isolation system for space-borne structures in the *Journal of Intelligent Material Systems and Structures*, Vol. 6 (November 1995). The system includes an apparatus for providing real-time, six degree-of-freedom active vibration isolation. The apparatus requires multiple accelerometers and at least six force sensor inputs, six analog outputs, a sixteen channel digital I/O, and extensive computation power to accommodate complex control algorithms. The active system of Z. Geng et al. includes two layers of six vibration control mechanisms. An upper layer is the six degrees-of-freedom active vibration isolator with a mobile plate and base plate connected by six active elements. Each active element consists of a Terfenol-D actuator, a force sensor, a pair of accelerometers, and a pair of flexible joints. Six accelerometers are mounted on the mobile plate to measure the residual vibration and another six are placed on the base plate to monitor base plate excitation. Both acceleration and force measurements are fed to signal conditioners and then delivered to a control system, which generates control signals to power amplifiers that drive the Terfenol-D actuators. This is a complex system with performance limited both by the mechanical connection between the two bodies and by the characteristics of the sensors used to measure residual vibrations.

U.S. Pat. No. 4,848,525 to Jacot et al. discloses a dual mode vibration isolator for actively isolating vibrations between a forward body and an aft body. The isolator includes an intermediate mechanical stage referred to as a "mounting member". The mounting member is pivotally connected via three pairs of linear actuators to the aft body. The mounting member exerts forces on the forward body via the use of three pairs of magnetic actuators. The linear actuators extend and contract to reposition the mounting member on the aft body, which in turn repositions the forward body relative to the aft body. Each magnetic actuator has an accompanying flux sensor and gap sensor, and each linear actuator is paired with a length sensor. Except for the additional mechanical stage, used to extend the range of motion between the forward and aft bodies at the expense of significant additional complexity, this is a typical magnetic isolation system with limited performance at low frequencies.

Edberg et. al. (AAS-96-071) describe the STABLE microgravity isolation system which exemplifies the state-of-the-art in magnetic isolation systems. The isolated payload is levitated by three dual-axis wide gap electromagnetic actuators. Signals from accelerometers located on the payload are used by a high bandwidth feedback controller to command counteracting electromagnetic actuator forces. Signals from three, two-axis optical sensors measure the position of the payload with respect to the mounting base and are used in a low bandwidth position loop to command the electromagnetic actuators. to keep the payload centered with respect to the base. As indicated by Edberg et. al., performance is limited by sensor characteristics, such as accelerometer noise floor. In addition, the control loop architecture limits isolation performance at low frequencies, near the bandwidth of the position control loop.

The problems with these and other existing vibration isolation systems are performance limitations at low frequencies, which is inherent to the architecture of these systems and specifically their control system architecture, and limitations associated with load, position, velocity and acceleration sensing, which, on existing systems, directly affect isolation performance.

What is needed is a system that exhibits superior vibration isolation performance down to very low frequencies, and isolation performance that is not limited by sensor characteristics. What is also needed is a system that allows control of the motion of the payload without limitation on its range of motion while using a small number of sensors and actuators to avoid the low reliability and high costs of a complex system.

SUMMARY OF THE INVENTION:

An object of the present invention is to provide a spacecraft architecture and in particular a spacecraft control architecture that simultaneously addresses the problems of payload pointing and motion control and vibration isolation, while providing superior vibration isolation down to zero frequency.

Another object of this invention is to provide a control architecture that allows the isolation of a payload from spacecraft-borne vibrations down to zero frequency, and a system in which the isolation performance is not limited by sensor characteristics.

Another object of this invention is to provide control of the attitude of a payload to any desired orientation without limitation on its range of motion, while isolating the payload from spacecraft-borne vibrations.

Still another object of the present invention is to provide precision pointing and motion control and vibration isolation for applications requiring high levels of motion control and stability, such as imaging payloads, laser-based communications and tracking systems.

The present invention achieves these and other objects by providing a system that includes a payload module and a support module that are preferably mechanically de-coupled. The motion of the payload module is controlled by reacting on the support module using non-contact actuators disposed between the two modules. The motion of the support module is controlled to follow the payload module using external actuators that react against the surroundings. In this way, no forces are applied between the payload and support modules due to relative motion control and vibration isolation is achieved down to zero frequency. Moreover, vibration isolation is not limited by sensor characteristics. In fact, if the sensors used to measure the motion of the payload module with respect to its surroundings stopped functioning, the payload module would be a drift, but the support module would continue to follow the payload module and the vibration isolation performance would be unaffected. In the system of this invention, the payload and support modules fly in formation in close-proximity and interact through non-contact actuators to achieve precision motion control and high motion stability of the payload module.

Specifically, the system of the present invention includes a spacecraft comprising of a payload module and a support module that are preferably mechanically de-coupled, and non-contacting means of measuring relative position and applying forces between the two modules. The payload module contains critical components requiring precision motion control and high motion stability, e.g. a telescope, a communications or a tracking system. The support module contains mission support equipment that does not require precise motion control and high motion stability. It also contains the main sources of vibration, such as reaction wheels and thrusters, and large flexible appendages, such as solar panels and sun-shields. Non-contact position sensors, disposed between the payload and support modules, are used to obtain information on the relative position and attitude between the payload and support modules: These sensors can be based on various technologies for non-contact measurement of distance, such as inductive, capacitive, or optical. Non-contact actuators, also disposed between the payload and support modules, are used to apply forces between the payload and support modules and control the motion of the payload module. These actuators can be electromagnetic, such as voice-coil actuators.

In a preferred embodiment, six non-contact position sensors and six non-contact actuators are arranged between the payload and support modules in a hexapod configuration. The non-contact actuators are voice-coil actuators with the field assembly preferably mounted on the payload module and the coil assembly mounted on the support module. Force control on each non-contact actuator allows relative motion between the payload and support modules without transmission of vibrations between the two modules. Force control is achieved with a high-bandwidth current control loop on the coil assembly of each voice-coil actuator which counter-act vibration induced currents on the coil assembly The system of the present invention also includes external actuators located on the support module, i.e. actuators that react against the surroundings, and payload or target sensors, i.e. sensors that provide information on the payload position and attitude with respect to its surroundings. The external actuators are used to move the support module by reacting against its surroundings, e.g. inertial space, and follow the motion of the payload module. Examples of external actuators for space application are thrusters, reaction wheels, magnetic torquers, control moment gyros, and solar sails. The payload or target sensors provide information required to control the motion of the payload with respect to its surroundings, e.g. inertial space. Examples of payload or target sensors for space applications are star-trackers, accelerometers and gyroscopes.

According to the control architecture of the present invention, a payload position and attitude control unit receives the signals from the payload or target sensors and outputs a command to the non-contact actuators that generate a force and/or moment between the payload and support modules to move the payload module to a desired position and/or orientation. At the same time, a relative position and attitude control unit receives the signals from the relative position sensors and outputs commands to the external actuators that move the support module by reacting against its surroundings, so that the support module follows the motion of the payload module. The external actuators thus move the support module to maintain a desired relative position and attitude with respect to the payload module. While the motion of the payload module is controlled with a high-degree of precision and is very stable, the motion requirements for the support module are much more relaxed. The support module merely must stay within a sufficient distance and angular range of the payload module in order to prevent the non-contact position sensors and non-contact actuators from going out of range.

A key element of the control architecture of this invention is that no forces are applied between the payload and support modules to maintain relative motion control, this allows vibration isolation down to zero frequency. Another important advantage of this architecture. is that the performance of the isolation system is not dependent on sensor characteristics and therefore, superior isolation can be achieved. The system and control architecture of the present invention also allows the payload to be pointed over the entire celestial sphere ($4\pi$ steradian).

In applications where some mechanical coupling is required between the payload and support modules, for example due to data and power cables and/or cooling lines, the non-contact position sensors and non-contact actuators can be used in closed-loop control to cancel the effect of the mechanical coupling between the two modules. This represents a simple modification in the control logic and does not require any additional hardware. In practice, the cancellation is not perfect and the isolation performance is reduced when compared with an equivalent mechanically de-coupled system.

A variation of the described control architecture, which is also part of the present invention, uses the non-contact actuators to perform relative position (translation) control and external actuators to perform relative attitude control between the payload and support modules. In this case, the forces on the non-contact actuators for relative position (translation) control are computed to generate zero moment about the center of mass of the payload module and therefore do not affect the attitude of the payload module. This variation is of particular interest for space applications where, in general, precise attitude control is required while control of translational motion is less important. In addition, in such applications the use of external actuators to maintain relative position (translation) control may, in some cases, present difficulties. For example, the use of thrusters on long duration missions may require a large amount of propellant that is not feasible to carry on-board of the spacecraft.

These and other objects and features of the invention will be better understood in referencing the following detailed description and drawings.

DETAILED DESCRIPTION OF THE PREFERRED EMBODIMENTS

Figure 1:
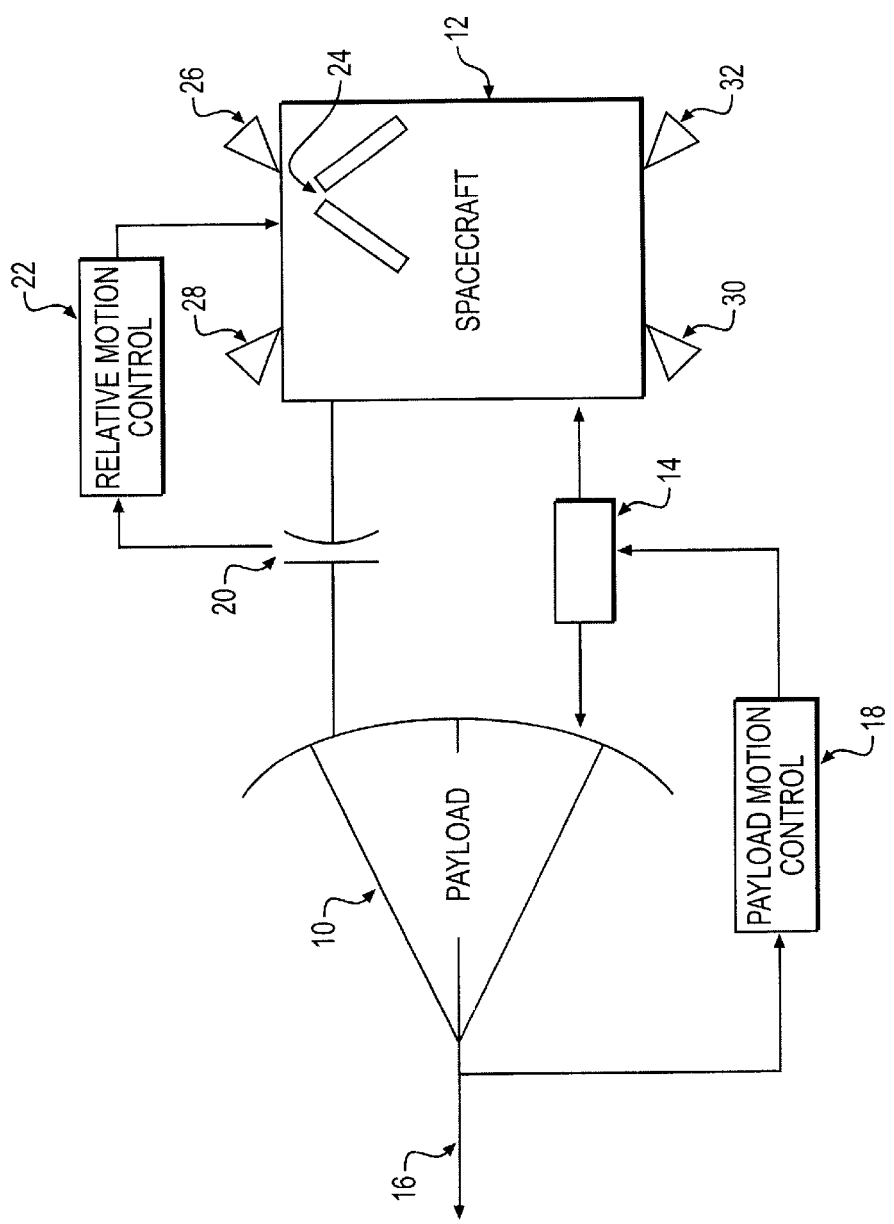
FIG. 1 is a top-level schematic view of the control system architecture according to a preferred embodiment of the present invention.

FIG. 1 schematically illustrates the control architecture of the present invention, in which a payload 10 is coupled to a spacecraft 12, through non-contact actuators 14 which are used to apply forces between the payload 10 and the spacecraft 12. Payload motion control is achieved by sending signals from payload motion sensors 16 to a payload motion control unit 18 that commands non-contact actuators 14 to apply forces to payload 10 that control its motion. Control of the relative motion between payload 10 and spacecraft 12 is achieved by sending signals from non-contact position sensors 20, used to measure the relative position between payload 10 and spacecraft 12, to a relative motion control unit 22 that commands external actuators located on the spacecraft, such as reaction wheels 24 and thrusters 26, 28, 30 and 32. This system provides complete; payload isolation from spacecraft vibrations down to zero frequency while providing position and attitude control of the payload. In addition, the characteristics of payload sensors 16 have no influence on the vibration isolation performance.

Figure 2:
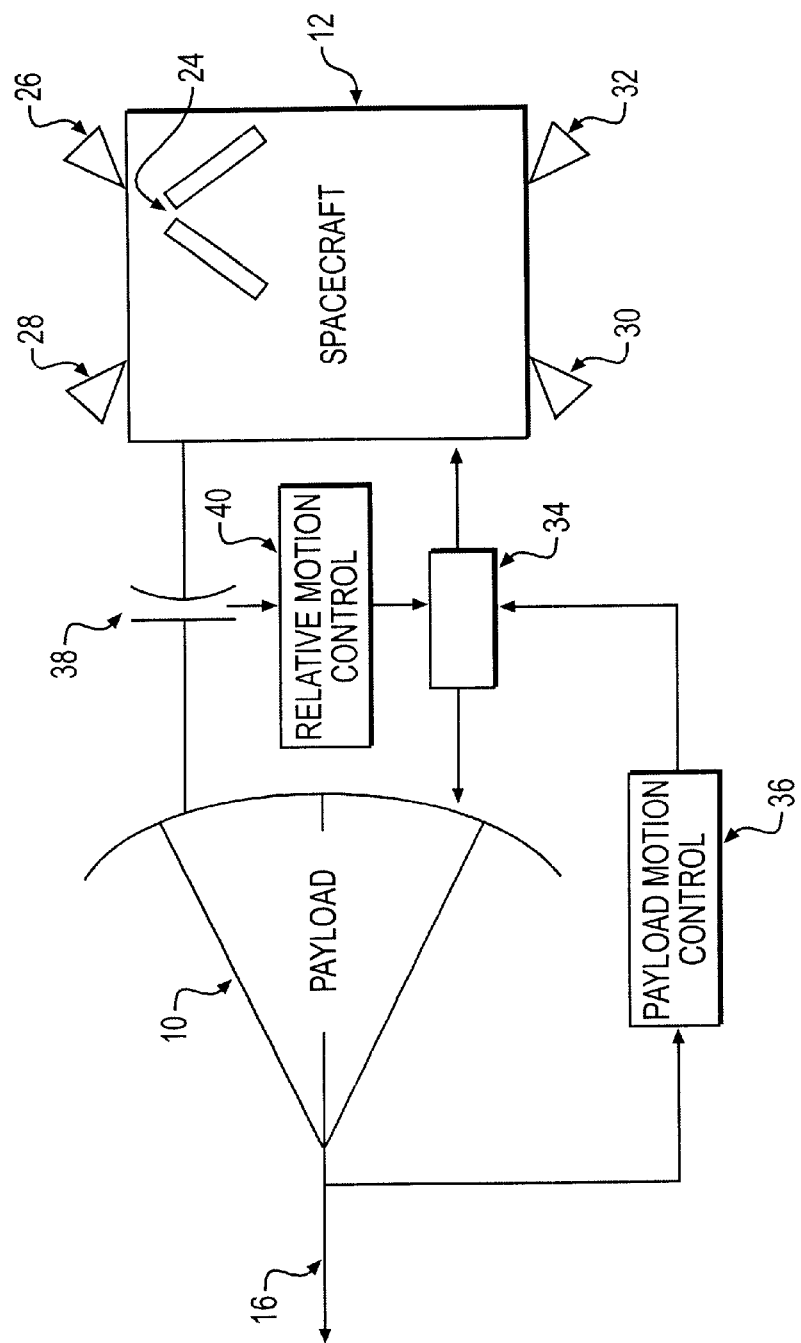
FIG. 2 is a top-level schematic view of a standard magnetic pointing and isolation system, upon which the present invention improves.

The control architecture of the present invention is substantially improved over conventional architectures. For example, FIG. 2 schematically represents a conventional magnetic pointing and isolation system in which a payload 10 is coupled to a spacecraft 12 through electromagnetic actuators 34. Relative position and attitude control is effected by feeding signals of relative position sensors 38 to a relative motion control unit 40 which commands actuators 34 to apply forces between the payload and the spacecraft and control relative motion. In this case, forces are applied between the payload and the spacecraft to effect both payload pointing control and relative motion control. Within this control architecture the conflicting objectives of vibration isolation and relative motion control inherently limit the amount of vibration isolation that can be achieved. Furthermore, in this system the conflicting objectives of isolation and relative motion control create a dependence between isolation performance and the characteristics of payload sensors 16.

Figure 3:
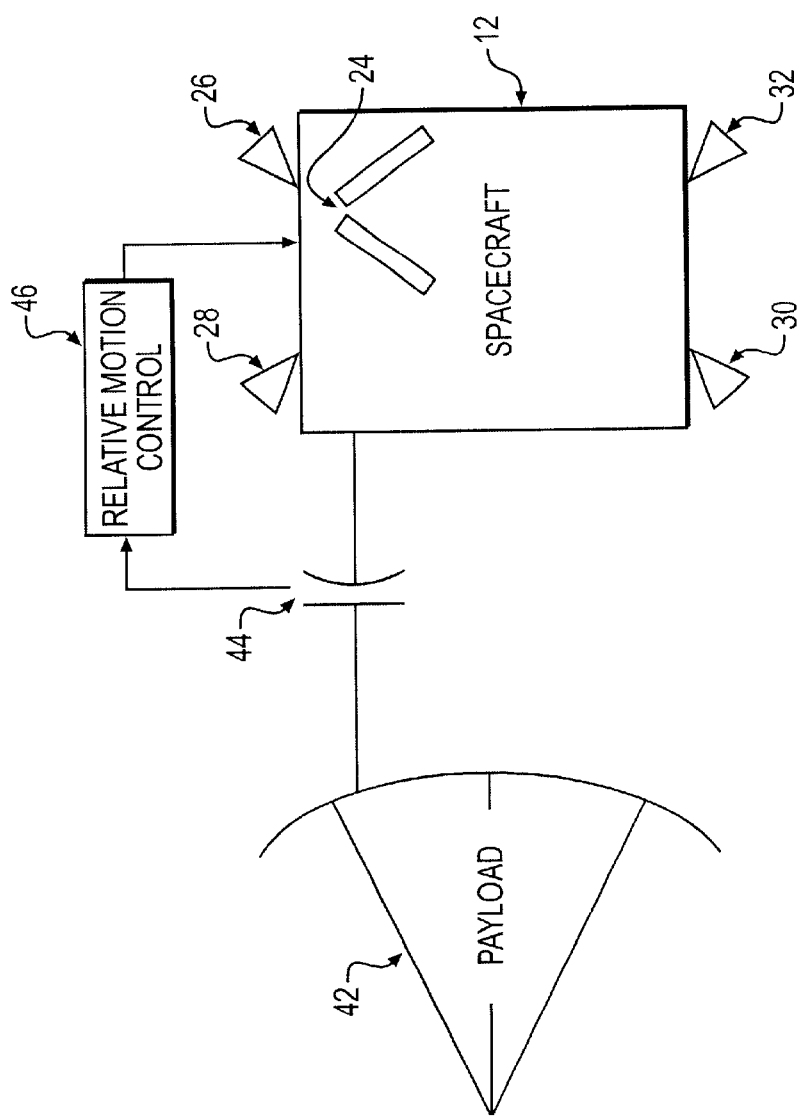
FIG. 3 is a top-level schematic view of the concept of a drag-free satellite.

Another conventional control architecture is shown in FIG. 3, and illustrates the principle of a drag-free satellite, in which there is no control of the payload, and no disturbances are transmitted to the payload. In this system the payload is generally enclosed inside the spacecraft to avoid any external disturbances, such as atmospheric drag in low-earth orbit. Relative position control consists of the spacecraft 12 following payload 42 which is in free-fall. The relative position between the payload and the spacecraft is determined using signals from position sensors 44, which are fed into a relative motion control unit 46 that commands thrusters 26, 28, 30 and 32 located on the spacecraft to apply forces on the spacecraft so that it follows the motion of the payload. This system provides no means of controlling the position or the attitude of the payload, which is essential for certain applications such as space-based telescopes.

Figure 4:
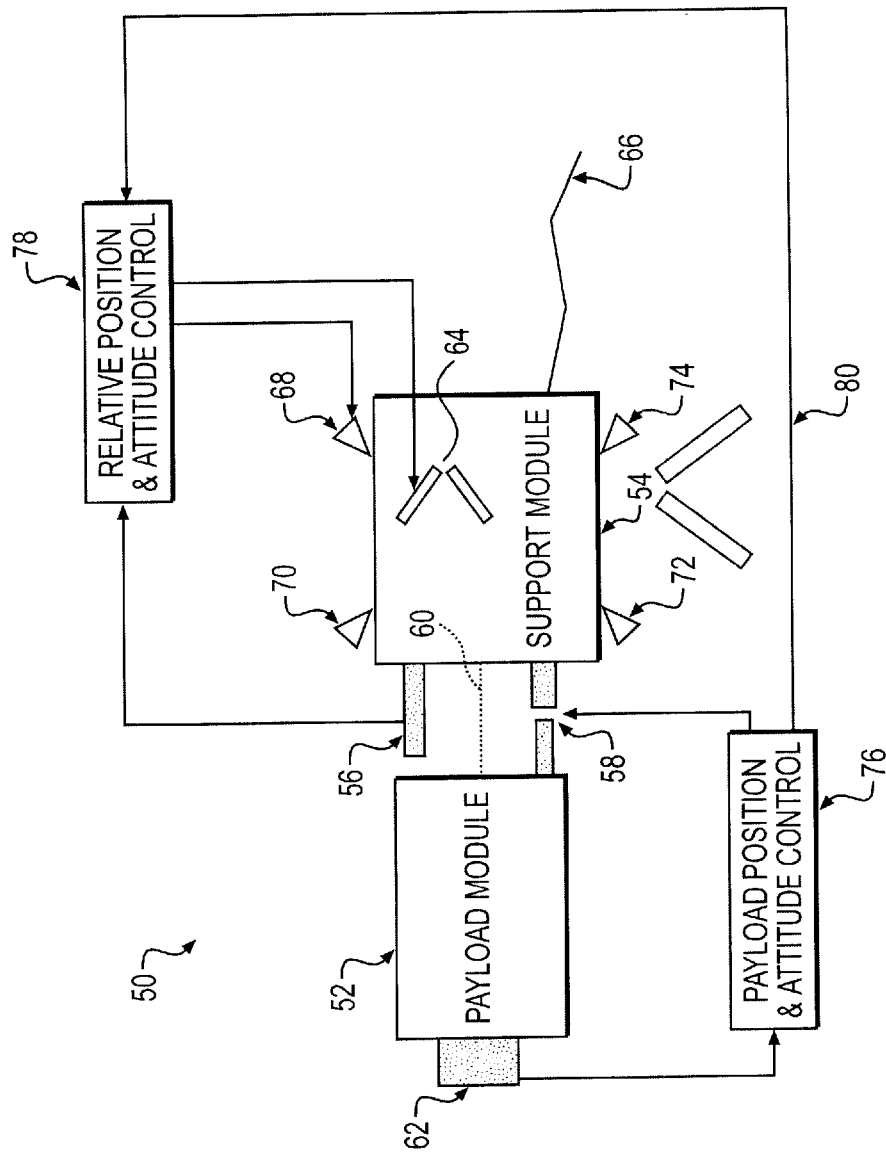
FIG. 4 is a schematic view of a spacecraft employing the unique architecture of the present invention.

Referring now to FIG. 4, which shows a schematic view of a spacecraft employing the unique architecture of the present invention, a spacecraft 50 includes a payload module 52, a support module 54, and non-contact position sensors 56 and non-contact actuators 58 disposed between the payload and support modules. Data and power links 60 transfer data and power between payload module 52 and support module 54. Data and power links 60 can be either wire links or wireless links. However, wireless links are preferred so that the payload and support modules are mechanically de-coupled. A wireless link can be implemented through ,for example, radio, optical, infra-red or microwave technologies.

The payload module 52 carries the primary mission hardware, such as a telescope, a communications system, a tracking system, or other devices or systems requiring stringent motion stability and control. Payload position and attitude sensors 62, e.g. star-trackers, gyroscopes, accelerometers and focal plane detectors, are preferably located on the payload module 52. These payload or target sensors, generally referred to by the. numeral 62, sense the position and/or attitude of the payload with respect to its surroundings or its target. Support module 54 preferably includes all sources of vibration, although it should be sufficient to position at least the major sources of vibration in or on the support module 54. Some of these sources of vibration include reaction wheels 64, deployable, flexible structures, such as a solar panels and sun-shields 66, and thrusters 68, 70, 72, and 74.

Non-contact position sensors 56, shown on the support module 54, are used to measure relative position and attitude between the payload module 52 and the support module 54. These sensors can be based on different technologies for non-contact measurement of distance, such as inductive, capacitive or optical.

Non-contact actuators 58 are used to apply forces between the payload module 52 and the support module 54. Non-contact actuators 58 can be electromagnetic or electrostatic devices or any other device allowing non-contact application of force between the payload and support modules. In a preferred embodiment, voice-coil actuators are used with the field assembly mounted on the payload module 52 and the coil assembly mounted on the support module 54. In this case, vibrations on the support module cause relative motion between the coil and field assemblies that induce current on the coil assembly and could cause some vibrations to be transmitted to the payload module. These vibration-induced currents are cancelled by controlling the current in the coil assembly, preferably using a high-bandwidth analog current control loop on each voice-coil actuator.

The motion of payload module 52 is controlled by feeding signals from payload sensors 62 to a payload position and attitude control unit 76 that outputs control signals to non-contact actuators 58. Non-contact actuators 58 apply forces and moments between the payload and support modules in order to move payload module 52 to a desired position and attitude.

The relative motion between the payload and support modules is controlled by feeding signals from relative position sensors 56 to a relative position and attitude control unit 78 that commands external actuators located on support module 54, such as reaction wheels 64 and thrusters 68, 70, 72, and 74. The external actuators apply forces on the support module in order for the motion of the support module to follow the motion of the payload module. External actuators are actuators that move the support module by reacting against the surroundings, e.g. inertial space. Examples of external actuators that can be used include, reaction wheels, control moment gyros, magnetic torquers, thrusters, and solar sails.

With this architecture, the payload module can achieve high-levels of motion stability and control while the requirements on relative motion control can be much more relaxed. In fact, requirements on relative motion control are driven mainly by the need to avoid collision between the payload and support modules and to prevent the non-contact position sensors and actuators from going out of range.

With this architecture, the motion of the payload module is controlled using non-contact actuators that react against the support module, while relative motion is controlled using external actuators to apply forces on the support module by reacting against the surroundings. In this way, no forces or moments are applied between the payload module and the support module to achieve relative motion control and vibration isolation is achieved down to zero frequency while allowing the payload module to pointed over the entire celestial sphere. In addition, vibration isolation performance is not limited by sensor characteristics because: (1) Even in the case of failure of payload sensors 62, which would place the payload module adrift, the support module would still follow the payload module with no impact in isolation performance; and (2) Errors from non-contact position sensors 56 do not translate into errors in payload module motion control.

During operation, payload module 52 and support module 54 fly in close proximity formation and interact through non-contact actuators 58 to provide precision motion control and high-levels of motion stability to payload module 52. During maneuvering, forces and moments commanded to non-contact actuators 58 and to external actuators, such as reaction wheels 64 and thrusters 68, 70, 72, and 74, are computed to generate coordinated motion of payload module 52 and support module 54 as a single body.

Forces and moments applied by non-contact actuators 58 to achieve motion control of payload module 52 produce reaction forces on support module 54. This causes relative motion between payload 52 and support module 54 that is measured by non-contact position sensors 56 and controlled by relative position and attitude control unit 78 using the external actuators. This relative motion due to non-contact actuator reaction forces and moments on the support module can be virtually cancelled by using the external actuators to counteract those forces and moments. Although this is not required for the control architecture to work, it can significantly improve the performance of the relative motion control. This is specially relevant in cases where payload module 52 has mass and inertia properties which are larger than those of support module 54, i.e. a large/massive payload module reacting against a smaller/less massive support module. This also allows the use of lower bandwidth on the relative motion control loop, which is advantageous in cases where the support module 54, includes large flexible structures such as solar arrays and/or sun-shields 66. In FIG. 4, this is indicated by control signal 80 sent from payload position and attitude control unit 76 to the relative position and attitude control unit 78. This signal is used in control unit 78 to command to the external actuators to apply additional forces and moments, on support module 54, which counteract the reaction forces and moments of the non-contact actuators on the support module.

Control units 76 and 78 could be located on either the payload module 52 or the support module 54. For example, if the payload sensors 62 are located on payload module 52, and payload position and attitude control unit 76 is located on support module 54, then signals from payload sensors 62 can be sent to control unit 76 via data/power link 60. The requirements for a data and/or power link depend on the specific application, for example data collected on payload module 52 may need to be transferred to support module 54 for storage and telemetry to a ground station. Wireless implementation of data/power link 60 is preferred as it provides no mechanical coupling between the payload and support modules, but other considerations may require implementation through cables. Additional mechanical coupling between the payload and support modules may be required in some applications, for example cooling lines between the two modules. In these cases, where mechanical coupling exists between the payload module 52 and support module 54, the control logic can be modified such that the control logic sends-a command to non-contact actuators 58to cancel the effect of the mechanical coupling between the two modules. The command is computed based on the signals. received from the non-contact position sensors 56. This represents a simple modification in the control logic and does not require any additional hardware. In practice, the cancellation is not perfect and the isolation performance is reduced when compared with an equivalent mechanically de-coupled system.

A variation of the described control architecture, which is an alternative embodiment of the present invention, uses the non-contact actuators 58, instead of external actuators, to perform relative position (translation) control between the payload and support modules, but not relative attitude control. As in the original architecture, external actuators are used to perform relative attitude control between the payload and support modules.

To perform relative position (translation) control, payload position and attitude control unit 76 computes a control signal which causes non-contact actuators 58 to apply forces to payload 52that generate zero moment about the center of mass of the payload module 52 and therefore do not affect the attitude of the payload module 52. This variation is of particular interest for space applications where, in general, precise attitude control is required while control of translational motion is less important. In addition, the use of external actuators to maintain relative translation control may, in some cases, present difficulties. For example, the use of thrusters for relative translation control on long duration missions may require a large amount of propellant that is not feasible to carry on-board of the spacecraft. According to this architecture, isolation of payload module attitude from vibrations of the support module is achieved down to zero frequency and isolation performance is not dependent on sensor characteristics. In addition, the payload module can be pointed over the entire celestial sphere. This variation of the control architecture will be described in more detailed in reference to the block diagram of FIG. 6.

The control architecture of FIG. 4 is more fully described with reference to FIG. 5, in which a spacecraft control system 100 includes two main types of control loops 102 and 104. Control loop 102 provides control in three axes of payload module position and attitude, and control loop 104 provides control in three axes of relative position and attitude between payload module 114 and the support module 124. Command generator 106 generates signals that define the desired motion of the support module 124 and payload module 114, for example, commands to point the payload at a given direction or to slew to a different orientation in space. These signals are sent to motion controllers 108 and 118 where they are compared to sensor measurements, that represent the actual motion, and processed through control logic algorithms that compute the required force and moment commands to achieve the desired motion control.

Focusing now on payload position and attitude control loop 102: Payload motion controller 108 receives signals from command generator 106, and from payload/target sensors 116 and generates control signals representing the forces and moments that should be applied to the payload module 114 to control its motion. These control signals are fed into distribution law 110. Distribution law 110 computes the forces to be applied by each of the non-contact actuators 112 to generate the required forces and moments on the payload module. Distribution law 110 sends control signals to non-contact actuators 112 that apply forces on payload module 114 producing a change in payload position and attitude which is measured by payload/target sensors 116.

Force control on each non-contact actuator is used to ensure that relative motion between payload module 114 and support module 124 do not cause transmission of vibrations between the two modules. As mentioned previously, in the case of voice-coil actuators force control is achieved by a high bandwidth current control loop that cancels vibration-induced currents on each non-contact actuator. This ensures that each non-contact actuator exerts the proper force to achieve the desired relative motion between the payload module 114 and the support module 123 without transmitting vibrations between the two modules. Forces applied by the non-contact actuators 112 on the payload module produce reaction forces on the support module, as indicated by the signals from non-contact actuators 112 which are fed into support module 124 through block 130.

Relative position and attitude control loop 104 operates as follows: Signals from relative position sensors 126, containing measurements from the relative motion between payload module 114 and support module 124, are fed into block 128 where the relative position and attitude between the payload and support modules are computed. Relative motion controller 118 receives signals from command generator 106, and from relative position and attitude determination unit 128 and generates control signals representing the forces and moments that should be applied to the support module to follow the motion of the payload module. These control signals are sent to distribution law 120 that computes and sends commands to external actuators 122 that apply forces and moments on support module 124 to track the motion-of payload module 114. External actuators 122 apply forces on support module 124 by reacting against the surroundings., In this way no reaction forces are applied on payload module 114 due to relative motion control. Consequently, the motion of the payload module is not perturbed by the relative motion control loop 104. This allows isolation of vibrations to be achieved down to zero frequency.

Signals 132 sent from distribution law 110 to distribution law 120 contain the forces and moments to be applied to control the motion of payload module 114. These signals are added to the commands to the external actuators to counteract the reaction forces and moments on the support module. As described previously, this is not required for the control architecture to work properly but it does provide significant improvement on the performance of the relative motion control loop.

The two main control loops 102 and 104 are one-way coupled, i.e. the payload position and attitude control loop 102 affects the relative position and attitude control loop 104, but control loop 104 does not affect control loop 102. This is clearly seen in the block diagram of FIG. 5, where: Payload motion control affects the relative motion control by 1) the reaction forces generated by non-contact actuators 112 on support module 124 (illustrated by block 130);

2) by changes in the output of position sensors 126 which ultimately drives the forces and moments of external actuators 122 on support module 124 (illustrated by the arrow extending from payload module 114 to position sensors 126); and 3) Signals 132 (optional) which are added to the commands to the external actuators to counteract the reaction forces and moments on the support module.

In contrast, there are no signals, forces or data, flowing from relative motion control loop 104 to payload motion control loop 102, and therefore, the motion of payload module 114 is not affected by motion of support module 124. As a consequence, the payload module is isolated from vibrations on the support module down to zero frequency and isolation performance is not dependent on the characteristics of position sensors 126. In addition, although payload motion control depends on the characteristics of payload/target sensors 116, the performance of the vibration isolation does not.

Control system 100 is preferably a digital control system. Payload motion controller 108 contains control logic that depends on the dynamic characteristics of payload module 114, non-contact actuators 112, and payload/target sensors 116. For example, a six-channel proportional-integral-derivative control logic can be used to control payload position and attitude. Non-contact actuators are preferably voice-coil actuators, with force control achieved through a high-bandwidth analog current control loop on the coil assembly of each actuator. In general, distribution law 110 consists of multiplying a vector with six elements, three forces and three moments, by a N by 6 matrix where N is the number of non-contact actuators. In a preferred configuration, where six actuators are used in a hexapod configuration, N is equal to 6. Distribution law 110 uses knowledge of the geometry of the system, such as location and orientation of non-contact actuators with respect to the center of mass of the payload module to compute the forces required on each non-contact actuator.

Relative motion controller 118 contains logic that depends on the dynamic characteristics of support module 124, external actuators 122 and position sensors 126. The control logic could be implemented, for example, through a six-channel proportional-integral-derivative control logic. Non-contact position sensors are preferably inductive sensors, although any technology for non-contact measurement of distance can be used, with six sensors arranged in a hexapod configuration between payload module 114 and support module 124. Relative position and attitude determination unit 128 transforms position sensor 126 readings into relative position (translation) and attitude between the payload and support modules. These transformations are generally non-linear but if the relative motion is small they can be linearized and reduced to a matrix multiplication.

External actuators 122 apply forces and moments on the support module 124 by reacting against the surroundings, for example reaction wheels, control moment gyros, and thrusters. Distribution law 120 transforms a vector with six elements, three forces and three moments to be applied on the support module, to specific forces and moments to be commanded to each of the external actuators.

Figure 5:
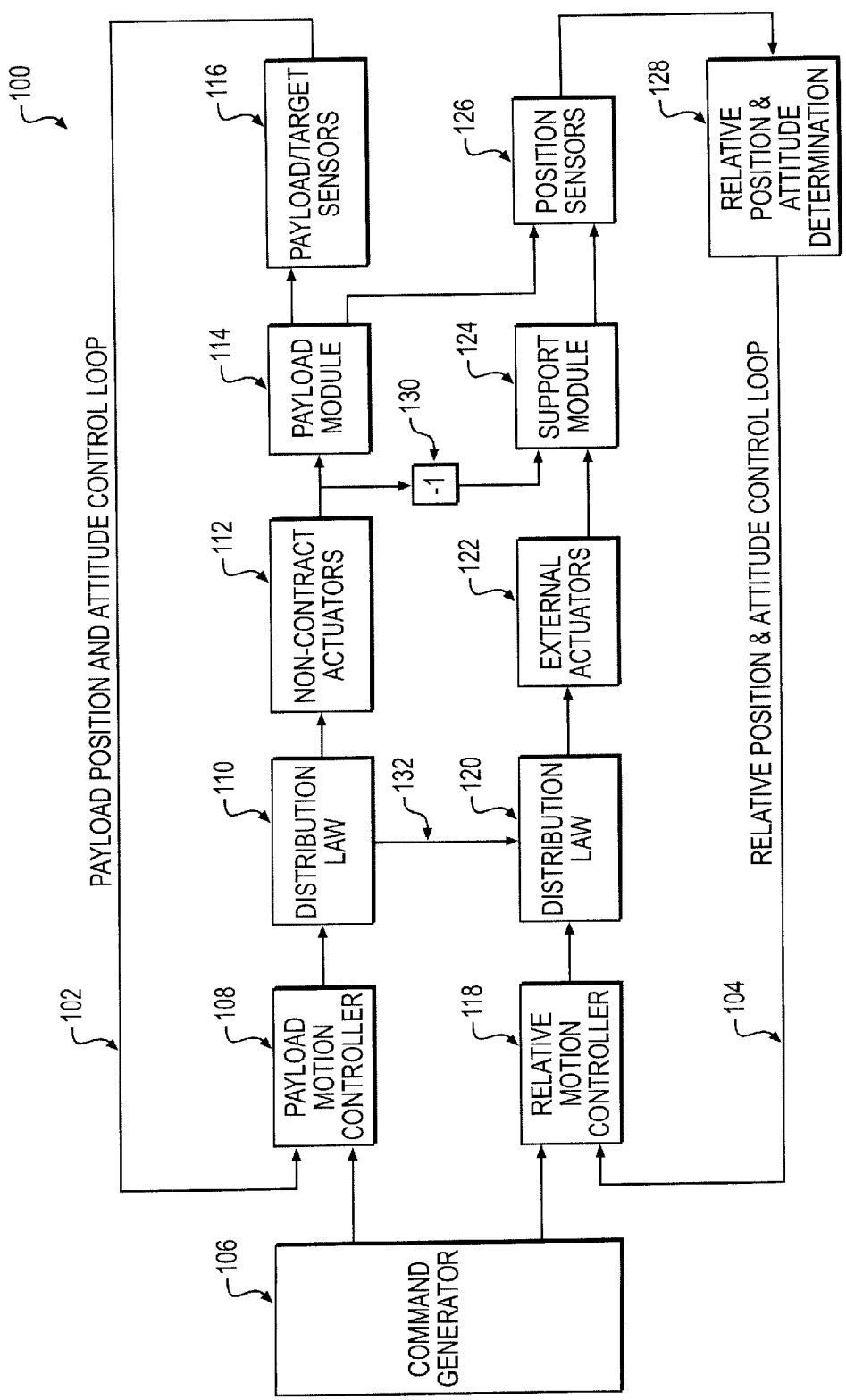
FIG. 5 is a block diagram of the control system architecture corresponding to that shown in FIG. 4.

In the case where mechanical coupling exists between payload module 114 and support module 124, an additional interaction should be added to the block diagram of FIG. 5, between block 114 and block 124. This can be due, for example to a data and/or power cable or a cooling line. In this case, the architecture of the control system remains unchanged but the control logic may require modifications to compensate for the mechanical coupling. As described previously, an optional approach in this case, is to use the non-contact actuators 112 to cancel the forces and moments between the payload and support modules due to the mechanical coupling. This requires an additional connection from relative motion controller 118 to distribution law 110, representing the estimated forces and moments due to the mechanical coupling, which should be cancelled by non-contact actuators 112. In this case, because cancellation is not perfect, isolation performance is reduced when compared with an equivalent mechanically de-coupled system.

For a large number of space applications, it is important to maintain attitude stability and attitude control of the payload while the position (translation) is less important. In addition, the use of external actuators to maintain relative translation control may present difficulties in some cases. For example, the use of thrusters on long duration missions may require a large amount of propellant that is not feasible to carry on board the spacecraft. For these applications, a variation of the architecture of FIG. 5 is used, as previously described. In this alternative embodiment, the non-contact actuators between the payload and the support modules are used both for payload attitude control and for relative translation control, while external actuators are used for relative attitude control. To avoid disturbing the payload attitude, the forces commanded to the non-contact actuators to achieve relative translation control are computed in such a way that they generate a zero moment about the payload center of mass.

Figure 6:
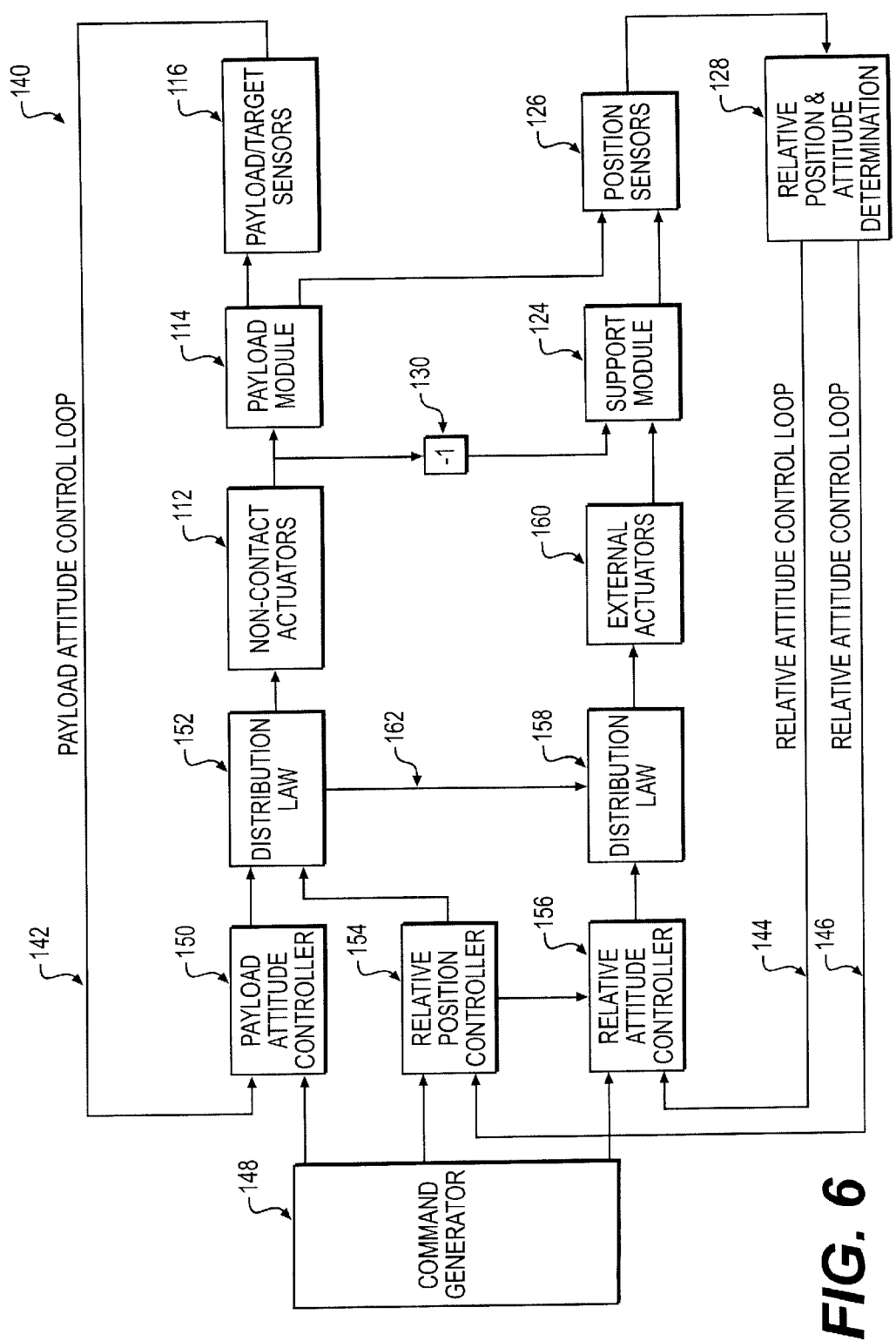
FIG. 6 is a block diagram of a variation of the control system architecture, corresponding to that shown in FIG. 5.

FIG. 6 contains a block diagram of the control system for this alternative embodiment. Control system 140 contains three main types of control loops: Control loop 142 provides payload module attitude control in three axes, control loop 144 provides control in three axes of relative attitude between the payload and support modules, and control loop 146 provides control in three axes of relative position (translation) between the payload and support modules. The key difference between this alternative embodiment and the original control architecture is the use of the non-contact actuators to effect relative position (translation) control without disturbing the attitude of the payload module.

In a payload attitude control loop 142, signals from payload/target sensors 116 are fed into a payload attitude controller 150 where they are used with signals from a command generator 148 in a control algorithm to compute the moment (torque) required to control the attitude of a payload module 114. The torque command signals from controller 150 are sent to a distribution law 152 where the forces required on each non-contact actuator are computed, to achieve the required torque on payload module 114, and sent to non-contact actuators 112 that apply those forces on payload module 114 by reacting on support module 124 as indicated through block 130. The resulting torque applied on payload module 114 controls its attitude to follow the command generated by command generator 148.

The payload attitude control loop 142 thus uses measurements from the payload/target sensors 116, such as gyros, start-tracker, and/or focal plane detectors, to compute the torque that should be applied to the payload by the non-contact actuators. Since the non-contact actuators are in the interface between the payload and support module, a torque will also be applied to the support module. In other words, the payload module reacts against the support module. The nominal value of this reaction torque is calculated and sent as a pre-compensation torque command, signal 162, to distribution law 158 on relative attitude control loop 144, which adds this torque to the commanded torque to external actuators 160, such as reaction wheels, mounted on the support module. As discussed previously, use of the pre-compensation torque is not required but can significantly improve performance of the relative attitude control loop.

Relative position (translation) between payload module 114 and support module 124 is controlled by relative position (translation) loop 146 where signals from position sensors 126 are fed to a relative position and attitude determination unit 128 where the. relative position and attitude between payload module 114 and support module 124 are computed. Relative position control unit 154 receives information on relative position from unit 128 and commanded signals from command generator 148 and uses a control algorithm to compute the forces required between the payload and support modules to control their relative translation. These commanded forces are sent to distribution law 152 that computes the required forces on each non-contact actuator to achieve the commanded forces between the payload and support modules while generating zero torque about the payload center of mass. Therefore, to the extent that the positions and orientations of the non-contact actuators are known the payload attitude is not affected: by the forces used to achieve relative translation control. Distribution law 152, receives torque commands from control unit 150 and force commands from control unit 154, and computes the forces that are required on each non-contact actuator so that the resultant torque about the center of mass of payload module 114 equals the torque commanded by payload attitude controller 150 and the resultant force between payload module and support module equals the force commanded by relative position controller 154. Command signal s from distribution law 112 are sent to non-contact actuators 112 which apply forces on payload module 114 that produce reaction forces on support module 124 as indicated by block 130.

Control of the relative attitude between the payload and support modules is achieved using external actuators, such as reaction wheels, control-moment gyros or thrusters. This is shown in relative attitude control loop 144, where signals from relative position and attitude determination unit 128, containing information on the relative attitude between payload module 114 and support module 124 are fed to a relative attitude control unit 156. Relative attitude controller 156 uses these signals and commands from command generator 148 to compute moments (torques) that should be applied on support module 124 so that it follows the angular motion of payload module 114. These commanded torques are sent from relative attitude controller 156 to distribution law 158 where commands to each of a number of external actuators are computed and sent to external actuators 160 that apply torques to support module 124 and control its attitude to track the attitude of payload module 114. In this way, no interaction forces or moments are applied between payload module 114 and support module 124 to achieve relative attitude control and therefore, the attitude of the payload module is not disturbed due to relative attitude control.

With this variation of the control architecture, the non-contact actuators are used both to control the attitude of the payload module and the relative translation between the payload module and the support module. The component of the non-contact actuator forces applied to achieve relative translation control are computed to generate zero moment (torque) about the center of mass of the payload module, and therefore do not disturb the attitude of the payload module. In addition, relative attitude control is achieved using external actuators, i.e. actuators that react against the surroundings, and do not affect the attitude of the payload module. This system isolates the payload attitude from disturbances on the support module down to zero frequency and the isolation is not limited by sensor characteristics. This system also provides control of the attitude of the payload module and pointing over the entire celestial sphere (4π steradians).

Figure 7:
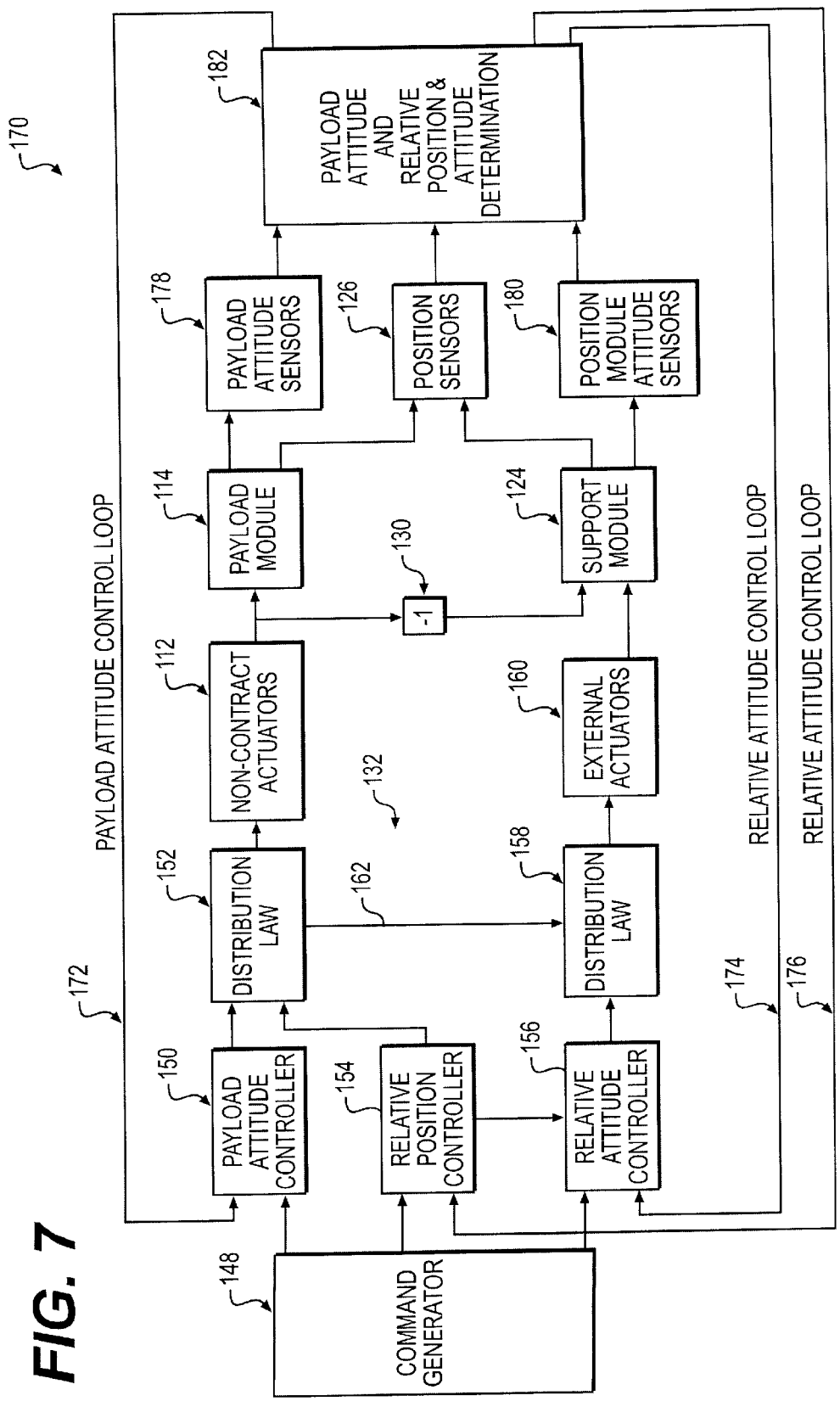
FIG. 7 is a block diagram of a variation of the control system architecture, corresponding to that shown in FIG. 6.

FIG. 7 shows a block diagram with a variation of the control architecture of FIG. 6. Control system 170 contains three main types of control loops: Payload attitude control loop 172, relative attitude control loop 174 and relative position (translation) control loop 176. These control loops work in a similar way as in the system of FIG. 6, except for the determination of the attitude of the payload module and the relative position and attitude between the payload module and the support module. In this system, the attitude of the payload can be determined using attitude sensors 180 located on the support module and relative position sensors 126 located at the interface of the payload and support modules. Signals from payload attitude sensors 178, position sensors 126, and support module attitude sensors 180 are fed into unit 182 where they are processed to generate estimates of payload attitude and relative position and attitude between the payload and support modules. This system has the same capabilities of the system of FIG. 6. It provides isolation of payload attitude from vibrations of the support module down to zero frequency, while allowing control of the attitude of the payload, and isolation performance is not limited by sensor characteristics.

In a preferred embodiment, payload attitude sensor 178 is a focal plane detector. Position sensors 126 are inductive position sensors disposed between the payload and the support modules and configured in such a way that it is possible to determine the relative position and attitude between the two modules from their measurements, for example, six sensors in a hexapod configuration. Support module attitude sensors 180 are preferably star-trackers and gyros mounted on the support module. Payload attitude and relative position and attitude determination unit 182 is preferably an optimal estimator containing an algorithm that combines measurements from all sensors, 178, 126 and 180, to compute a best estimate for the payload attitude and relative position and attitude between payload and support modules. Attitude sensors 178 located on the payload module are not necessarily required to determine the attitude of the payload module, and the system could have two modes of operation that depending on the availability of a signal from payload attitude sensors 178. In a coarse pointing mode signals from sensors 178 are not available and the payload attitude is determined from the attitude of the support module, provided by sensors 180, and the relative attitude between the payload and support modules, computed from the signals of position sensors 126. In a fine pointing mode signals from payload attitude sensors 178 are available, and are combined with signals from sensors 126 and 180 to generate a best estimate of the attitude of the payload module.

In some situations it may be desirable to have a system with no payload attitude sensors or a limited number of sensors located on the payload (for example, for reasons of power dissipation, heat dissipation, or limited space available on the payload). In such cases, the payload attitude can be determined from the attitude of the support module, provided by sensors 180, and the relative attitude between the payload and support modules.

Figure 8:
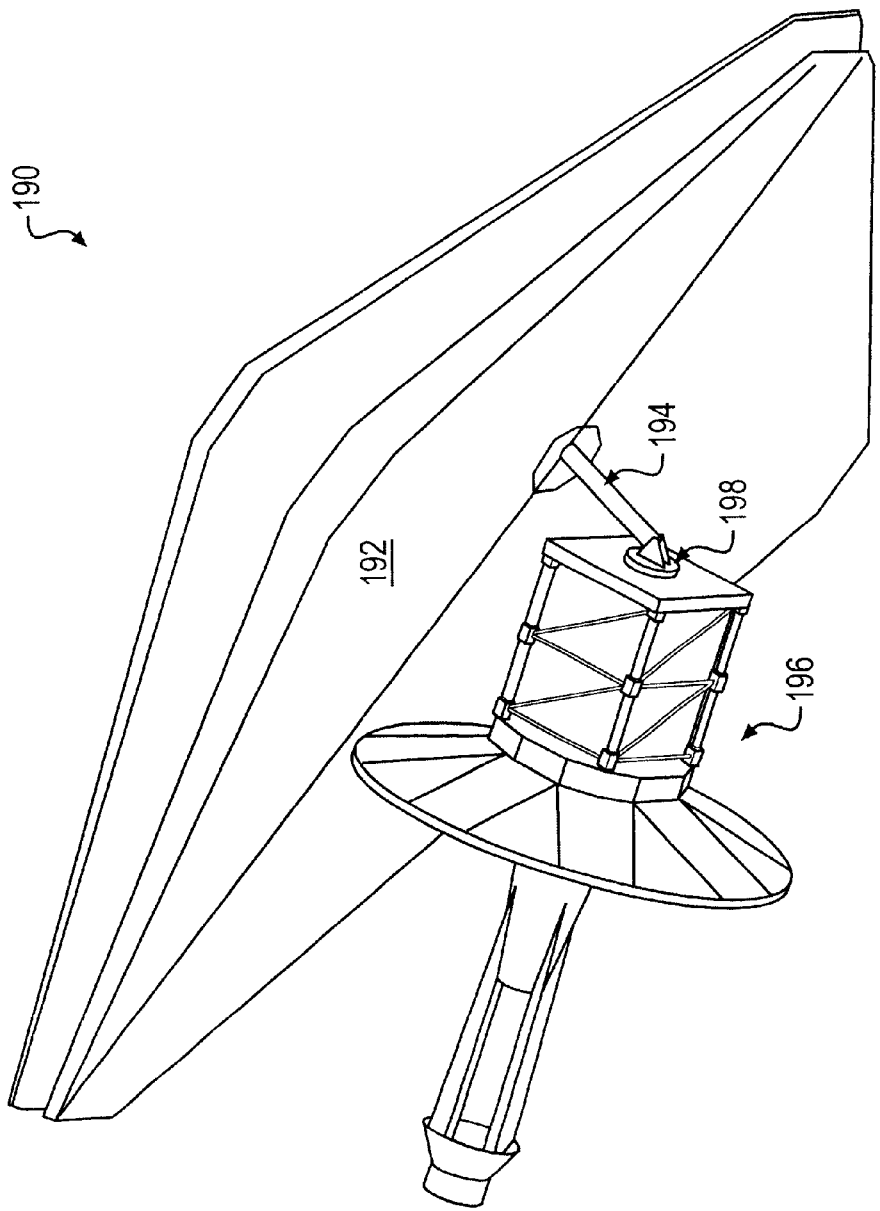
FIG. 8 is a side elevational view of a spacecraft according to a preferred embodiment of the present invention.
Figure 9:
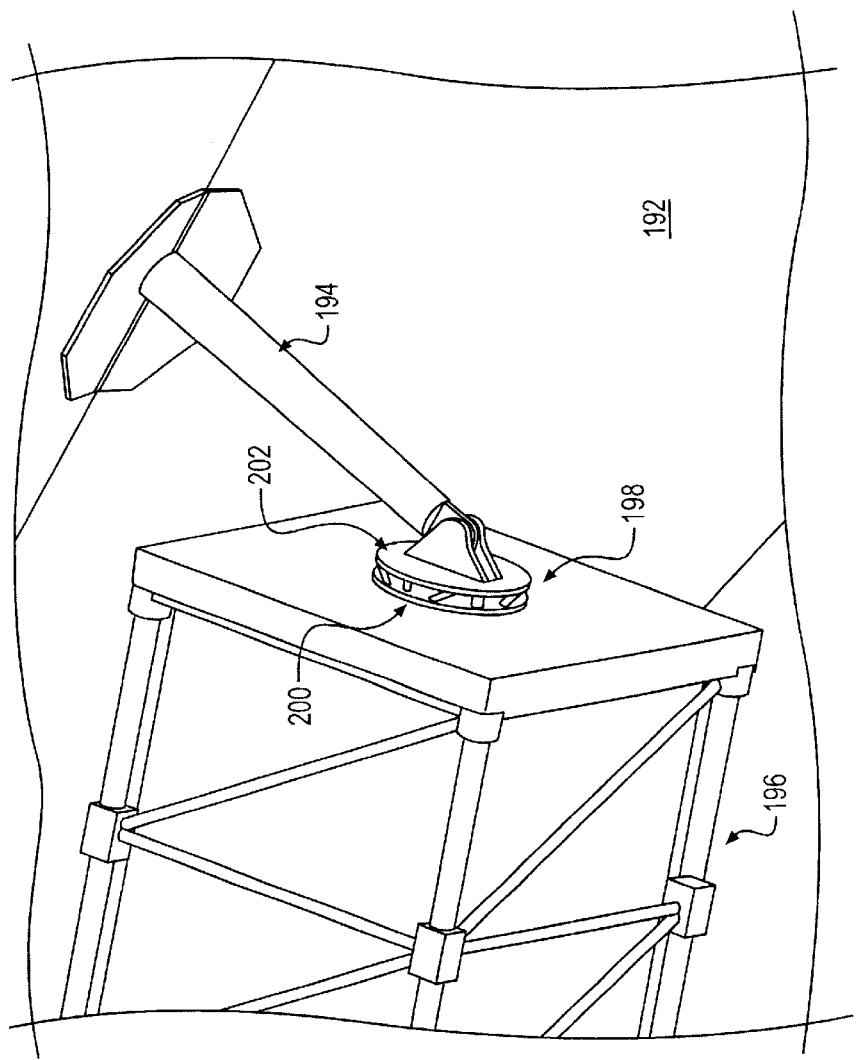
FIG. 9 is an enlarged perspective view of the spacecraft of FIG. 8, showing. in greater detail the coupling of the payload to the support module.

An example of a spacecraft according to the present invention is shown in FIG. 8, in which a spacecraft 190 includes a payload module 196, shown as a space telescope, which has stringent requirements on motion stability and pointing control. The payload module is coupled to a support module, obscured from view by a sun shield 192 through a strut 194 having one end mechanically connected to the support module, and the other end coupled through a non-contact coupling member 198. FIG. 9, shows an enlarged view of the interface between payload module 196 and the support module. Coupling member 198 mounts to payload module 196 through interface plate 200 that couples to a second interface plate 202 through non-contact actuators as will be further described in the next paragraph. Second interface plate 202 is mechanically attached to strut 194 that is mechanically coupled to the support module. In this way, interface plate 200 is mechanically attached to payload module 196 and interface plate 202 is mechanically attached to the support module, but when in operation, interface plates 200 and 202 are not mechanically coupled. Their coupling occurs through non-contact actuators such as voice-coil actuators without any mechanical contact. Therefore, coupling member 198 provides mechanical de-coupling between the payload module and the support module. Mechanical coupling between the payload and support modules may be required in some applications, for example for data and/or power lines or cooling lines, in this cases the coupling members could be routed through coupling interface 198.

Figure 10:
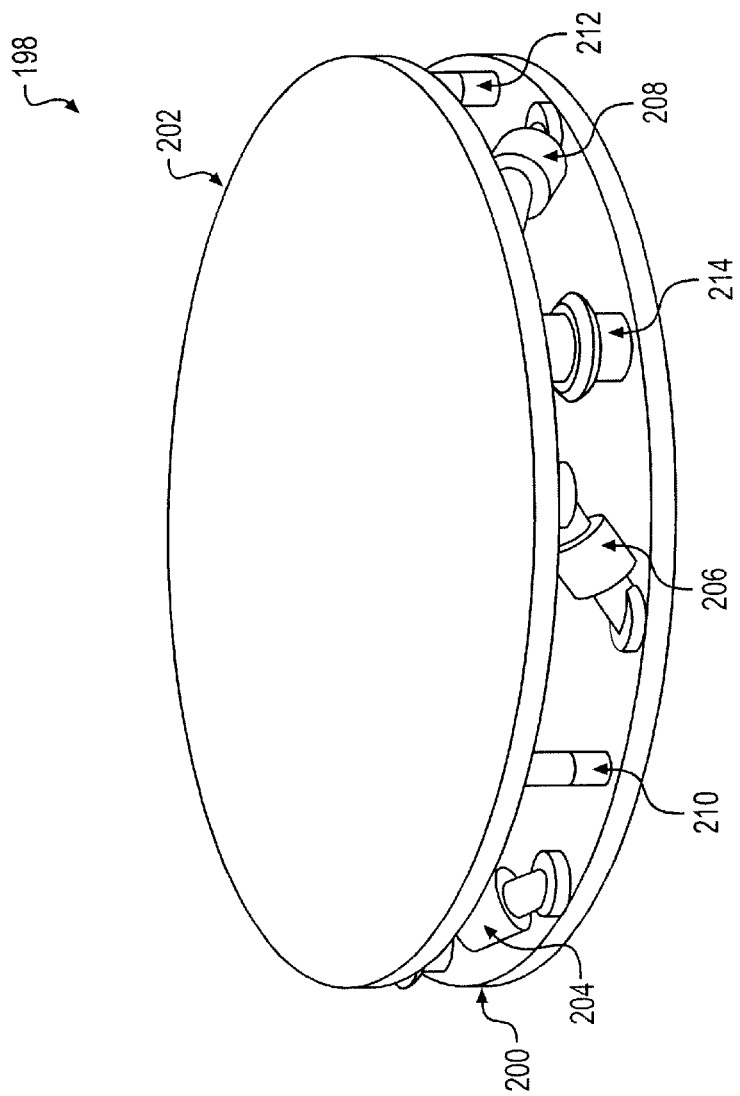
FIG. 10 is an enlarged, perspective view of the coupling of FIG. 9.

As seen in FIG. 10, the coupling member 198 includes a first interface plate 200 a second interface plate 202. The two interface plates are coupled to each other through non-contact actuators and relative position sensors 204, 206 and 208 (three others not visible) where, in this arrangement each non-contact actuator is integrated with a non-contact position sensor into a single unit. Non-contact actuators are preferably voice-coil actuators with the field assembly mounted to interface plate 200 and coil assembly mounted to interface plate 202. Non-contact position sensors are preferably inductive sensors with the sensor head mounted to interface plate 202 and the target material mounted to interface plate 200. Non-contact actuators and position sensors are preferably arranged in a hexapod configuration that allows application of forces and moments on three perpendicular axis referenced to the payload module, and allow retrieval of the relative position and attitude between the interface plates 200 and 202 and therefore, between the payload and support modules.

The assembly includes centering male/female members 210 and 212 (one other not visible) and launch locks 214 (two others not visible). The centering members can be used in conjunction with the non-contact actuators to mechanically engage the payload and support modules. In this case, the non-contact actuators would apply forces to bring the two interface plates together until the mechanical contact occurs on the male/female interface of the centering members. This may be desirable during some spacecraft operations such as station keeping, where thrusters, located preferably on the support module, would be activated to move the entire spacecraft and achieve orbit correction. Launch locks are required to mechanically connect the payload and support and support modules during launch and can also be useful during integration and testing of the spacecraft. Depending on the mission requirements, mechanical locks could also be used infrequently during the mission for operations that may require a mechanical connection between the payload and support modules.

Figure 11:
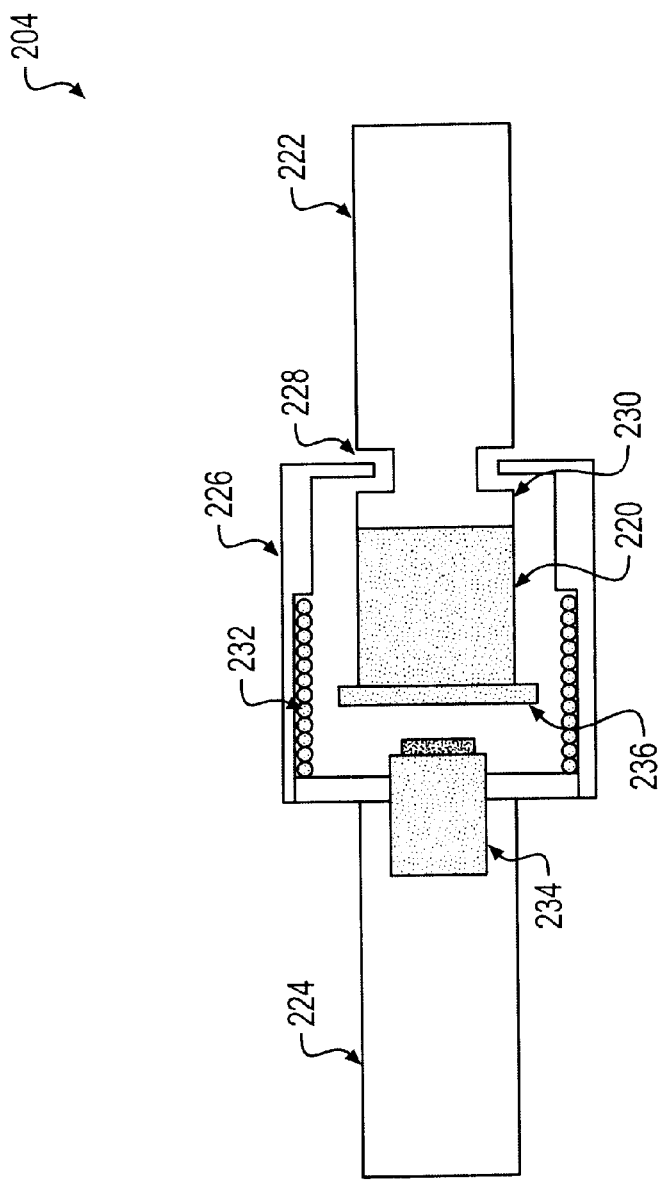
FIG. 11 is a perspective view, partially cut-away, of an actuator capable of use in the present invention.

FIG. 11 shows in greater detail a non-contact actuator/position sensor unit 204, which includes a permanent magnet 220 connected to an arm 222, made of non-magnetic material such as aluminum, that is connected at its distal end to the payload-side plate 200. A second arm 224 is connected at its distal end to the support module-side plate 202. A coil housing 226 is fixedly connected to the second arm 224, and contains a wire, preferably cooper, winding in the form of a coil 232. Coil housing 226 provides a cavity in which the first arm 222 moves axially in response to the electromagnetic effect caused by electric current through coil 228 on the magnet 220 fixed to arm 222. The housing has an opening through which the arm 222 is permitted to move, without actually contacting any of the other parts of the actuator. The proximal end portion of the arm 222 has a circumferential groove 228 that permits travel of the arm, preferably on the order of a few millimeters. The groove 228 forms a headed portion 230 that is larger in diameter than the opening in the housing, thereby providing means for preventing separation. The active portion of an inductive position sensor 234 is fixedly mounted to the coil housing 226, and provides measurement of the distance from the head of sensor 234 to a target plate 236 mounted to the proximal end of magnet 220. Target plate is made of non-magnetic material, preferably aluminum.

The preferred embodiment of FIGS. 8, 9 10 and 11, provides a compact interface for coupling two bodies, i.e. a payload module and a support module, that allows application of forces and moments as well as determination of position and attitude between the payload and support modules. The interface contains six non-contact actuators and position sensors, as well as launch locks, mechanical stops and male/female members that allow docking between the payload and support modules.

Figure 12:
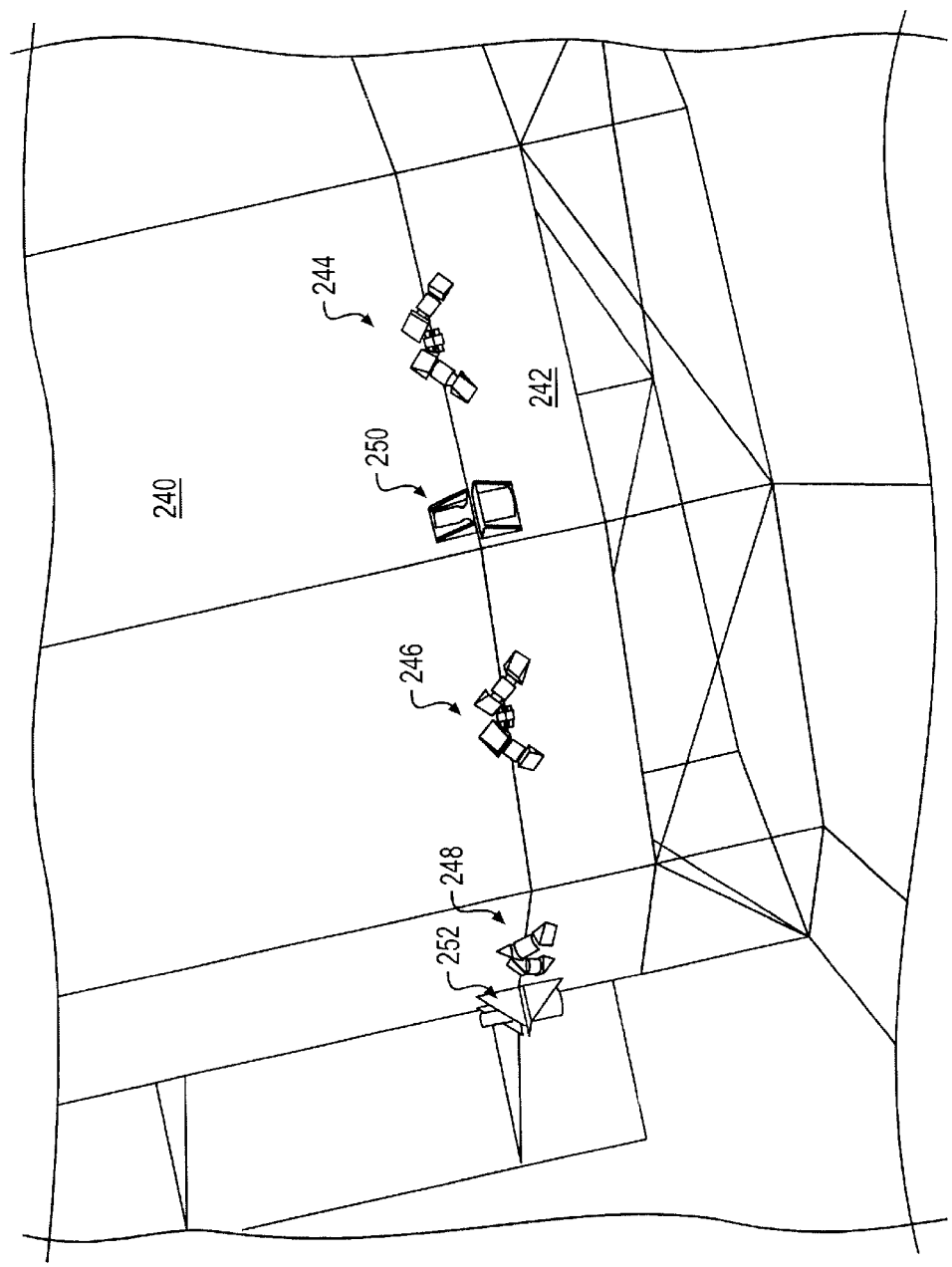
FIG. 12 is a schematic view of a second embodiment of the system of the present invention.

FIG. 12 shows a second preferred embodiment used in the design of a spacecraft containing a payload requiring extreme levels of motion stability and control. In this system, payload module 240 and support module 242 have a hexagonal cross-section and are coupled through non-contact actuators and position sensors mounted directly to the sides of the hexagonal cylinder defining the envelope of the payload and the support modules. Coupling assemblies 244, 246, 248 (three others not visible), containing non-contact actuators, position sensors and mechanical stops are mounted on each side of the hexagonal cylinder. Launch locks 250, 252 (one other not visible) are mounted on every-other side of the hexagonal cylinder and used to mechanically connect the payload module 240 to the support module 242 during launch. This system has a total of twelve non-contact actuators and twelve position sensors, i.e. twice the required number, for redundancy purposes.

Figure 13:
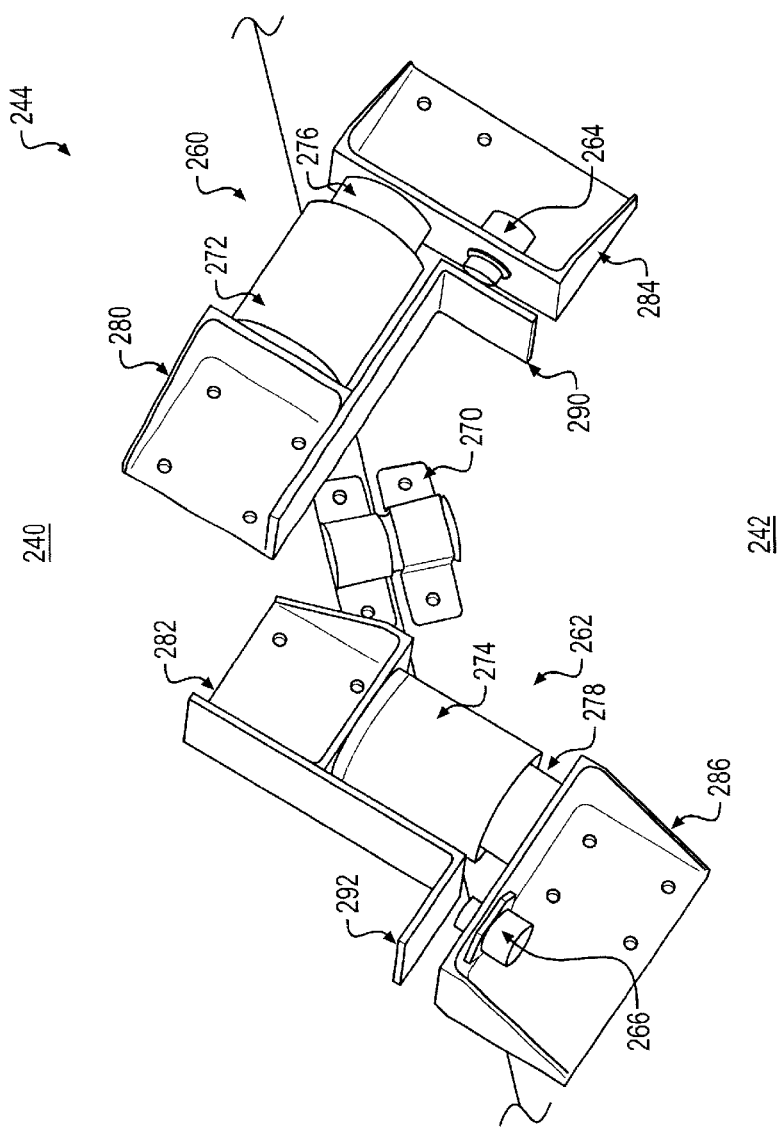
FIG. 13 is a close-up view of the embodiment of FIG. 12 showing a pair of non-contact position sensors and actuators and a mechanical stop to limit relative motion.

FIG. 13 shows an enlarged view of coupling assembly 244 containing non-contact actuators 260 and 262, non-contact position sensors 264 and 266, and a male/female interface consisting of a dual cone interface 268 and a dual cup interface 270. Non-contact actuators 260 and 262 are preferably voice-coil actuators with field assemblies 272 and 274 mounted to payload module 240 through brackets 280 and 282, and coil assemblies 276 and 278 mounted to support module 242 through brackets 284 and 286. Non-contact position sensors 264 and 266 are preferably inductive sensors and are mounted to support module 242 through brackets 284 and 286. These sensors measure the distance from the sensor head to target plates 290 and 292 mounted to payload module 240. Driving an electrical current through coil assemblies 276 and 278, creates forces between the coil and field assemblies of actuators 260 and 262 and therefore forces between payload module 240 and support module 242. Relative motion between the payload and the support modules creates a change in distance between sensor 264 and its target plate 290 that is measured by sensor 264. This measurement is used in conjunction with similar measurements from the other sensors to determine the relative position and attitude between payload module 240 and support module 242. A male-female interface consisting of dual cone interface 268 mounted to payload module 240 and dual cup interface 270 mounted to support module 242 provides a mechanical stop, and limits the range of relative motion between payload module 240 and support module 242. This interface can also be used for docking of the payload and support modules by providing a mechanical contact interface between the two the modules and using the non-contact actuators to pull the two modules together or push them apart.

Figure 14:
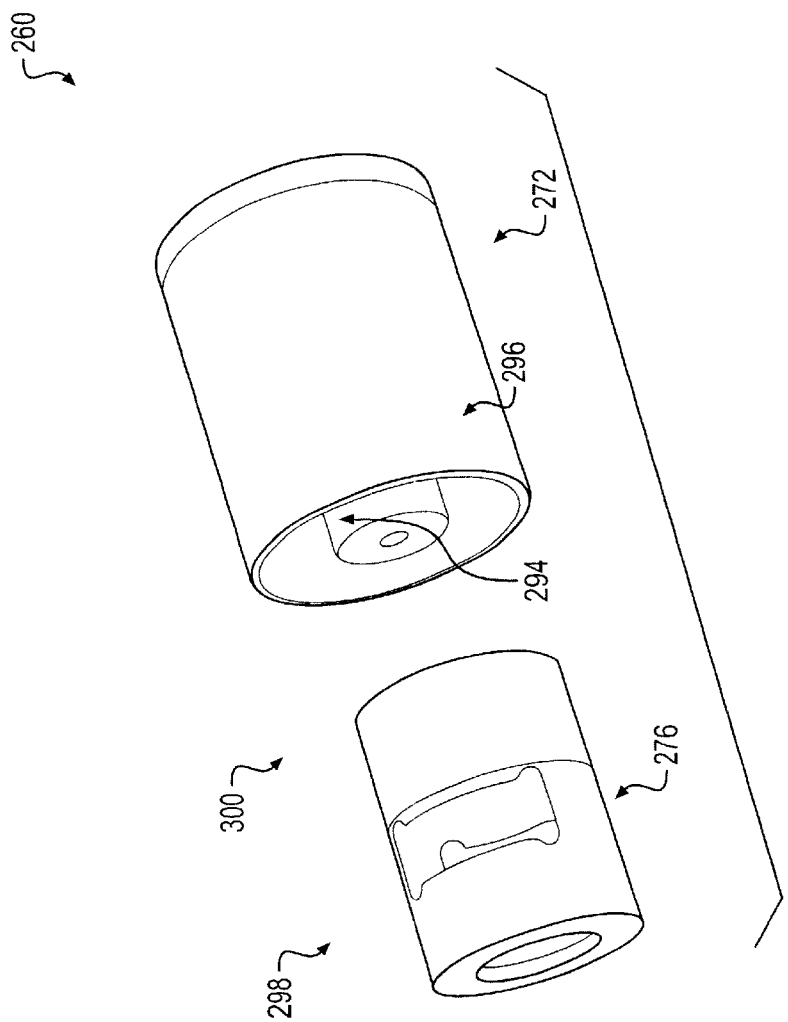
FIG. 14 is a view of a non-contact position sensor and actuator combined into a compact assembly that could. be used in the embodiment of FIG. 13.

Non-contact actuator 260 is shown in FIG. 14 in an enlarged view, and consists of a voice-coil actuator, preferably with a radial gap and stroke of a few millimeters. Field assembly 272 contains a permanent magnet (not visible) and a core 294 and a shell 296 build from ferromagnetic material, such as vanadium permendur. Coil assembly 276 consists of an aluminum supporting member 298 on which a wire made of an electric conductor, preferably cooper, is wound to form electric coil 300.

What is claimed is:

1. A system for controlling the motion of a payload while isolating disturbances to the payload generated on a support module, comprising:

a non-contact actuator capable of generating forces and moments between the support module and the payload to move the payload to a desired position and/or attitude; and an external actuator located on the support module capable of reacting against the surroundings to move the support module to a desired relative position and/or attitude with respect to the payload without applying reaction forces between the payload and the support module.

2. The system of claim 1, further including:

payload sensors sensing the position and/or attitude of the payload;

a relative position sensor sensing a relative position and/or attitude between the support module and the payload;

a payload position and attitude control unit computing a control signal based on the position and/or attitude of the payload, and outputting the control signal to the non-contact actuator to move the payload to the desired position and/or attitude; and a relative position and attitude control unit computing a control signal based on the relative position and/or attitude between the support module and the payload, and outputting a control signal to the external actuator to move the support module to a desired relative position and/or attitude with respect to the payload.

3. The system of claim 2, wherein the non-contact actuator is integrated with the relative position sensor into a single unit.

4. The system of claim 2, wherein the payload carries a telescope, a communications system, or racking system.

5. The system of claim 2, wherein the payload sensor includes at least one of a gyroscope, an accelerometer, a star-tracker, or a focal plane detector.

6. The system of claim 2, wherein the external actuator includes at least one of a thruster, a reaction wheel, a magnetic torquer, and a solar sail.

7. The system of claim 2, wherein the payload sensor is located on the payload, the payload position and attitude control unit is located on the support module, and the payload sensor sends the payload position/attitude signal to the payload position and attitude control unit through a data/power link.

8. The system of claim 7, wherein the data/power link is a wireless communication device or a cable.

9. The system of claim 2, wherein the non-contact actuator is at,least one of an electromagnetic actuator and an electrostatic actuator.

10. The system of claim 2, further including:

six non-contact position sensors and six non-contact actuators arranged between the payload and support modules in a hexapod configuration.

11. The system of claim 2, wherein the relative position and attitude control unit outputs a control signal to the external actuator to move the support module to follow the motion of the payload module by maintaining a relative position and/or attitude with respect to the payload module which avoids a collision between the payload and the support module, and prevents the non-contact actuators and position sensors from going out of range.

12. The system of claim 1, further including:

a force control device for reducing or eliminating transmission of disturbances by the non-contact actuator.

13. The system of claim 12, wherein the force control device performs current control on the non-contact actuator.

14. The system of claim 13, wherein the force control device is a current control loop for canceling disturbance-induced currents in the non-contact actuator.

15. The system of claim 14, wherein the non-contact actuator is a voice-coil actuator.

16. The system of claim 1, wherein the external actuator applies a force and/or moment on the support module to counteract reaction forces and/or moments produced on the. support module by the non-contact actuator.

17. The system of claim 1, wherein the non-contact actuator performs relative position/translation control between the payload and support module, and the external actuators perform relative attitude control between the payload and support module.

18. The system of claim 1, wherein the non-contact actuator applies a force and/or moment which counteracts the forces and/or moments caused by a mechanical coupling between the payload and the support module.

19. The system of claim 1, wherein the payload is isolated from vibrations or disturbances on the support module down to zero frequency.

20. The system of claim 1, further including:

a support module position/attitude sensor; and a relative position/attitude sensor sensing a relative position/attitude between the support module and the payload, wherein the payload position/attitude is determined based on the position/attitude of the support module and the relative position/attitude between the payload and the support module.

21. The system of claim 20, wherein the payload can be moved with a coarse pointing mode or a fine pointing mode, wherein in fine pointing mode, the payload position/attitude is determined based on sensing the position/attitude payload module as sensed by a payload position/attitude sensor, and wherein in coarse pointing mode, the payload position/attitude is determined based on sensing the position/attitude of the support module and the relative position and/or attitude between the support module and the payload.

22. The system of claim 1, wherein payload isolation performance is not limited by sensor characteristics.

23. The system of claim 1, further including:

a first interface plate mechanically coupled to the payload;

a second interface plate mechanically coupled to the support module;

wherein a first portion of the non-contact actuator is mounted on the first interface plate and a second portion of the non-contact actuator is located on the second interface plate.

24. The system of claim 23, further including:

centering members mounted on the first and second interface plates for mechanically engaging the payload and support module;

launch locks mounted on the first and second interface plates for mechanically connecting the payload and support and support modules; and mechanical stops;

wherein the centering members, launch locks, and mechanical stops allow docking of the payload to the support module.

25. A method for isolating support module disturbances from a payload, comprising:

determining a position and/or attitude of a payload;

determining a relative position and/or attitude between a support module and the payload;

moving the payload to achieve a desired position and/or attitude by the use of non-contact actuators exerting a force and/or moment between the payload and the support module; and moving the support module to achieve a desired relative position and attitude between the payload and the support module by the use of external actuators, located on the support module, reacting against the surroundings without applying reaction forces between the payload and the support module.

26. The method of claim 25, wherein the position and/or attitude of the payload is determined based on sensing the position and/or attitude of the support module and the relative position and/or attitude between the support module and the payload.

27. The method of claim 26, wherein the payload can be moved with a coarse pointing mode or a fine pointing mode, p1 wherein in fine pointing mode, the payload position and/or attitude is determined based on the position and/or attitude of the payload module as sensed by a payload sensor, and wherein in fine pointing mode, the payload position and/or attitude is determined based on sensing the position and/or attitude of the support module and the relative position and/or attitude between the support module and the payload.

28. The method of claim 25, further including:
sending a payload position/attitude signal from a payload sensor to a payload position and attitude control unit through a data/power link.

29. The method of claim 25, wherein the external actuator moves the support module to a relative position with the payload module which avoids a collision between the payload and support module, and prevents the position sensors and non-contact actuators from going out of range.

30. The method of claim 25, further including:
performing force control on the non-contact actuators to isolate disturbances and/or vibrations from the payload.

31. The method of claim 25, wherein force control is performed by canceling disturbance-induced currents in the non-contact actuators to isolate disturbances and/or vibrations from the payload.

32. The method of claim 25, wherein the external actuator applies a force and/or moment on the support module to counteract reaction forces and/or moments produced on the support module by the non-contact actuator.

33. The method of claim 25, wherein the non-contact actuators perform relative position/translation control between the payload and support module, and the external actuators perform relative attitude control between the payload and support module.

34. The method of claim 25, wherein the non-contact actuator applies a force and/or moment which counteracts the forces and/or moments caused by a mechanical coupling between the payload and the support module.

35. The method of claim 25, wherein the payload is isolated from vibrations or disturbances on the support module down to zero frequency.

36. The system of claim 35, wherein the non-contact actuator is a voice-coil actuator.

37. A system for controlling the motion of a payload while isolating disturbances to the payload generated on a support module, comprising:
a non-contact actuator capable of generating a forces and moments between the support module and the payload to move the payload to a desired position and/or attitude;
an external actuator capable of reacting against the surroundings to move the support module to a desired relative position and/or attitude with respect to the payload;
payload sensors sensing the position and/or attitude of the payload;
a relative position sensor sensing a relative position and/or attitude between the support module and the payload;
a payload position and attitude control unit computing a control signal based on the position and/or attitude of the payload, and outputting the control signal to the non-contact actuator to move the payload to the desired position and/or attitude; and
a relative position and attitude control unit computing a control signal based on the relative position and/or attitude between the support module and the payload, and outputting a control signal to the external actuator to move the support module to a desired relative position and/or attitude with respect to the payload,
wherein the relative position and attitude control unit outputs a control signal to the external actuator to move the support module to follow the motion of the payload module by maintaining a relative position and/or attitude with respect to the payload module which avoids a collision between the payload and the support module, and prevents the non-contact actuators and position sensors from going out of range.

38. A system for controlling the motion of a payload while isolating disturbances to the payload generated on a support module, comprising:
a non-contact actuator capable of generating forces and moments between the support module and the payload to move the payload to a desired position and/or attitude, wherein the non-contact actuator performs relative position/translation control between the payload and support module; and
an external actuator capable of reacting against the surroundings to move the support module to a desired relative position and/or attitude with respect to the payload, wherein the external actuator performs relative attitude control between the payload and support module.

39. A system for controlling the motion of a payload while isolating disturbances to the payload generated on a support module, comprising:
a non-contact actuator capable of generating forces and moments between the support module and the payload to move the payload to a desired position and/or attitude, wherein the non-contact actuator applies a force and/or moment to the payload module that generates substantially zero moment about the center of mass of the payload module;
an external actuator capable of reacting against the surroundings to move the support module to a desired relative position and/or attitude with respect to the payload;
a force control device for reducing or eliminating transmission of disturbances by the non-contact actuator, wherein the force control device performs current control on the non-contact actuator and comprises a current control loop for canceling disturbance-induced currents in the non-contact actuator.

40. A system for controlling the motion of a payload while isolating disturbances to the payload generated on a support module, comprising:
a non-contact actuator capable of generating forces and moments between the support module and the payload to move the payload to a desired position and/or attitude;

an external actuator capable of reacting against the surroundings to move the support module to a desired relative position and/or attitude with respect to the payload;

a support module position/attitude sensor; and a relative position/attitude sensor sensing a relative position/attitude between the support module and the payload, wherein the payload position/attitude is determined based on the position/attitude of the support module and the relative position/attitude between the payload and the support module.

41. The system of claim 40, wherein the payload can be moved with a coarse pointing mode or a fine pointing mode, wherein in fine pointing mode, the payload position/attitude is determined based on sensing the position/attitude payload module as sensed by a payload position/attitude sensor, and wherein in coarse pointing mode, the payload position/attitude is determined based on sensing the position/attitude of the support module and the relative position and/or attitude between the support module and the payload.

42. A system for controlling the motion of a payload while isolating disturbances to the payload generated on a support module, comprising:

a non-contact actuator capable of generating a forces and moments between the support module and the payload to move the payload to a desired position and/or attitude; and an external actuator capable of reacting against the surroundings to move the support module to a desired relative position and/or attitude with respect to the payload, wherein payload isolation performance is not limited by sensor characteristics.

43. A system for controlling the motion of a payload while isolating disturbances to the payload generated on a support module, comprising:

a non-contact actuator capable of generating a forces and moments between the support module and the payload to move the payload to a desired position and/or attitude;

an external actuator capable of reacting against the surroundings to move the support module to a desired relative position and/or attitude with respect to the payload;

a first interface plate mechanically coupled to the payload;

a second interface plate mechanically coupled to the support module;

centering members mounted on the first and second interface plates for mechanically engaging the payload and support module;

launch locks mounted on the first and second interface plates for mechanically connecting the pan load and support and support modules; and mechanical stops;

wherein a first portion of the non-contact actuator is mounted on the first interface plate and a second portion of the non-contact actuator is located on the second interface plate, and wherein the centering members, launch locks, and mechanical stops allow docking of the payload to the support module.

44. A method for isolating support module disturbances from a payload, comprising:

determining a position and/or attitude of a payload;

determining a relative position and/or attitude between a support module and the payload;

moving the payload to achieve a desired position and/or attitude by the use of non-contact actuators-exerting at force and/or moment between the payload and the support module; and moving the support module to achieve a desired relative position and attitude between the payload and the support module by the use of external actuators reacting against the surroundings, wherein the position and/or attitude of the payload is determined based on sensing the position and/or attitude of the support module and the relative position and/or attitude between the support module and the payload, wherein the payload can be moved with a coarse pointing mode or a fine pointing mode, wherein in fine pointing mode, the payload position and/or attitude is determined based on the position and/or attitude of the payload module as sensed by a payload sensor, and wherein in fine pointing mode, the payload position and/or attitude is determined based on sensing the position and/or attitude of the support module and the relative position and/or attitude between the support module and the payload.

45. A method for isolating support module disturbances from a payload, comprising:

determining a position and/or attitude of a payload;

determining a relative position and/or attitude between a support module and the payload;

moving the payload to achieve a desired position and/or attitude by the use of non-contact actuators exerting t force and/or moment between the payload and the support module; and moving the support module to achieve a desired relative position and attitude between the payload and the support module by the use of external actuators reacting against the surroundings, wherein the external actuator moves the support module to a relative position with the payload module which avoids a collision between the payload and support module, and prevents the position sensors and non-contact actuators from going out of range.

46. A method for isolating support module disturbances from a payload, comprising:

determining a position and/or attitude of a payload;

determining a relative position and/or attitude between a support module and the payload;

moving the payload to achieve a desired position and/or attitude by the use of non-contact actuators exerting a force and/or moment between the payload and the support module; and moving the support module to achieve a desired relative position and attitude between the payload and the support module by the use of external actuators reacting against the surroundings, wherein the non-contact actuators perform relative position/translation control between the payload and support module, and the external actuators perform relative attitude control between the payload and support module.

47. A method for isolating support module disturbances from a payload, comprising:

determining, a position and/or attitude of a payload;

determining a relative position and/or attitude between a support module and the payload;

moving the payload to achieve a desired position and/or attitude by the use of non-contact actuators exerting a force and/or moment between the payload and the support module; and moving the support module to achieve a desired relative position and attitude between the payload and the support module by the use of external actuators reacting against the surroundings, wherein the non-contact actuators apply a force and/or moment to the payload module that generates substantially zero moment about the center of mass of the payload module.

48. A system for controlling the motion of a payload while isolating disturbances to the payload generated on a support module, comprising:

a non-contact actuator capable of generating forces and moments between the support module and the payload to move the payload to a desired position and/or attitude, wherein the non-contact actuator applies a force and/or moment to the payload module that generates substantially zero moment about the center of mass of the payload module; and an external actuator capable of reacting against the surroundings to move the support module to a desired relative position and/or attitude with respect to the payload.

49. A method for isolating support module disturbances from a payload, comprising:

determining a position and/or attitude of a payload;

determining a relative position and/or attitude between a support module and the payload;

moving the payload to achieve a desired position and/or attitude by the use of non-contact actuators exerting a force and/or moment between the payload and the support module, wherein the non-contact actuators apply a force and/or moment to the payload module that generates substantially zero moment about the center of mass of the payload module; and moving the support module to achieve a desired relative position and attitude between the payload and the support module by the use of external actuators reacting against the surroundings.

* * * * *